(12) United States Patent
Fujiwara et al.

(10) Patent No.: US 12,070,934 B2
(45) Date of Patent: Aug. 27, 2024

(54) POWER STORAGE DEVICE PACKAGING MATERIAL, METHOD FOR PRODUCING POWER STORAGE DEVICE PACKAGING MATERIAL, AND POWER STORAGE DEVICE

(71) Applicant: DAI NIPPON PRINTING CO., LTD., Tokyo (JP)

(72) Inventors: Ryo Fujiwara, Tokyo (JP); Masahiro Imai, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 730 days.

(21) Appl. No.: 17/269,477

(22) PCT Filed: Sep. 12, 2019

(86) PCT No.: PCT/JP2019/035797
§ 371 (c)(1),
(2) Date: Feb. 18, 2021

(87) PCT Pub. No.: WO2020/054789
PCT Pub. Date: Mar. 19, 2020

(65) Prior Publication Data
US 2021/0308988 A1    Oct. 7, 2021

(30) Foreign Application Priority Data
Sep. 12, 2018 (JP) .................. 2018-170919

(51) Int. Cl.
*H01M 50/00* (2021.01)
*B32B 7/12* (2006.01)
(Continued)

(52) U.S. Cl.
CPC ................ *B32B 7/12* (2013.01); *B32B 27/08* (2013.01); *B32B 27/306* (2013.01); *B32B 27/32* (2013.01);
(Continued)

(58) Field of Classification Search
CPC . H01M 50/116; H01M 10/0525; B32B 27/16; B32B 15/082; B32B 15/085
See application file for complete search history.

(56) References Cited

U.S. PATENT DOCUMENTS

2010/0015431 A1    1/2010   Matsui et al.
2012/0315462 A1   12/2012   Matsui et al.
(Continued)

FOREIGN PATENT DOCUMENTS

CN    101535040 A    9/2009
CN    103098257 A    5/2013
(Continued)

OTHER PUBLICATIONS

He et al., Packing Material, Case and Power Storage device, See the Abstract. (Year: 2017).*
(Continued)

*Primary Examiner* — Cynthia H Kelly
*Assistant Examiner* — Monique M Wills
(74) *Attorney, Agent, or Firm* — Oliff PLC

(57) ABSTRACT

A power storage device packaging material has good flexibility, and has electrolytic solution resistance. A power storage device packaging material in which a plurality of films are laminated, the packaging material including a heat-sealable resin layer, a gas barrier film layer laminated and disposed on one surface of the heat-sealable resin layer, and a plurality of adhesive layers, wherein the gas barrier film layer includes a resin base material and a gas barrier film disposed on one surface or both surfaces of the resin
(Continued)

base material, and of the plurality of adhesive layers, at least an adhesive layer disposed between the heat-sealable resin layer and the gas barrier film layer has electrolytic solution resistance.

23 Claims, 2 Drawing Sheets

(51) Int. Cl.
| | |
|---|---|
| B32B 27/08 | (2006.01) |
| B32B 27/30 | (2006.01) |
| B32B 27/32 | (2006.01) |
| B32B 27/34 | (2006.01) |
| B32B 27/36 | (2006.01) |
| B32B 37/12 | (2006.01) |
| B32B 37/18 | (2006.01) |
| H01G 11/80 | (2013.01) |
| H01G 11/84 | (2013.01) |
| H01M 50/10 | (2021.01) |
| H01M 50/119 | (2021.01) |
| H01M 50/121 | (2021.01) |
| H01M 50/129 | (2021.01) |
| H01M 50/14 | (2021.01) |
| H01M 50/141 | (2021.01) |
| H01G 11/60 | (2013.01) |
| H01G 11/62 | (2013.01) |

(52) U.S. Cl.
CPC .............. *B32B 27/34* (2013.01); *B32B 27/36* (2013.01); *B32B 37/12* (2013.01); *B32B 37/182* (2013.01); *H01G 11/80* (2013.01); *H01G 11/84* (2013.01); *H01M 50/10* (2021.01); *H01M 50/119* (2021.01); *H01M 50/121* (2021.01); *H01M 50/129* (2021.01); *H01M 50/14* (2021.01); *H01M 50/141* (2021.01); *B32B 2250/24* (2013.01); *B32B 2255/10* (2013.01); *B32B 2255/205* (2013.01); *B32B 2307/54* (2013.01); *B32B 2307/581* (2013.01); *B32B 2307/714* (2013.01); *B32B 2307/7246* (2013.01); *B32B 2311/24* (2013.01); *B32B 2315/02* (2013.01); *B32B 2323/10* (2013.01); *B32B 2329/04* (2013.01); *B32B 2367/00* (2013.01); *B32B 2377/00* (2013.01); *B32B 2457/10* (2013.01); *B32B 2457/16* (2013.01); *H01G 11/60* (2013.01); *H01G 11/62* (2013.01)

(56) References Cited

U.S. PATENT DOCUMENTS

| | | |
|---|---|---|
| 2013/0149597 A1 | 6/2013 | Suzuta et al. |
| 2013/0252065 A1 | 9/2013 | Ueda |
| 2015/0017518 A1 | 1/2015 | Taniguchi |
| 2016/0036013 A1 | 2/2016 | Nakazato et al. |

FOREIGN PATENT DOCUMENTS

| | | | |
|---|---|---|---|
| CN | 105315934 A | | 2/2016 |
| CN | 106848111 A | | 6/2017 |
| JP | 2013-149397 A | | 8/2013 |
| JP | 2013-196947 A | | 9/2013 |
| JP | 2015-072822 A | | 4/2015 |
| JP | 2015-179618 A | | 10/2015 |
| JP | 2017071414 A | * | 4/2017 |
| WO | 2013/031148 A1 | | 3/2013 |
| WO | 2018/164219 A1 | | 9/2018 |

OTHER PUBLICATIONS

Oct. 29, 2019 Search Report issued in the International Patent Application No. PCT/JP2019/035797.
Jan. 5, 2021 Office Action issued in Chinese Patent Application No. 201980009490.2.
Sep. 17, 2021 Office Action issued in Chinese Patent Application No. 201980009490.2.
Feb. 25, 2022 Office Action issued in Chinese Patent Application No. 201980009490.2.

* cited by examiner

POWER STORAGE DEVICE PACKAGING MATERIAL, METHOD FOR PRODUCING POWER STORAGE DEVICE PACKAGING MATERIAL, AND POWER STORAGE DEVICE

TECHNICAL FIELD

The present disclosure relates to a power storage device packaging material, a method for producing the power storage device packaging material, and a power storage device.

BACKGROUND ART

A power storage device typically has power storage device elements, such as electrodes and an electrolyte, and a packaging material for sealing the power storage device elements.

As the packaging material, for example, a power storage device packaging material is used which is a laminate having a resin film, a metal foil layer, and a heat-sealable resin layer, wherein an adhesive layer is disposed between the films (for example, Patent Literature 1). The power storage device packaging material is used as a packaging material for a power storage device by, for example, inserting the power storage device elements between films of the power storage device packaging material, and heat-sealing the outer peripheral regions of the power storage device packaging material. Moreover, the power storage device packaging material is optionally press-molded according to the thickness, the shape, and the like of the power storage device elements.

CITATION LIST

Patent Literature

Patent Literature 1: JP 2013-196947 A

SUMMARY OF INVENTION

Technical Problem

Power storage devices have recently been used in various types of equipment, and have diversified in shape. As one example, there is a need for power storage devices having flexibility.

For example, a power storage device packaging material having a metal foil layer, as disclosed in Patent Literature 1, typically has low flexibility, although it has moldability. Therefore, such a power storage device packaging material having a metal foil layer is difficult to apply to a power storage device having flexibility.

Electrolytic solution resistance is also required in a power storage device packaging material.

The present disclosure has been made in view of the foregoing circumstances, and it is a main object of the present invention to provide a power storage device packaging material having good flexibility, and having electrolytic solution resistance.

Solution to Problem

The present disclosure provides a power storage device packaging material that has flexibility and in which a plurality of films are laminated, the packaging material comprising a heat-sealable resin layer, a gas barrier film layer laminated and disposed on one surface of the heat-sealable resin layer, and a plurality of adhesive layers, wherein the gas barrier film layer includes a resin base material and a gas barrier film disposed on one surface or both surfaces of the resin base material, and
of the plurality of adhesive layers, at least an adhesive layer disposed between the heat-sealable resin layer and the gas barrier film layer has electrolytic solution resistance.

Advantageous Effects of Invention

According to the present disclosure, a power storage device packaging material having good flexibility and having electrolytic solution resistance can be provided.

DESCRIPTION OF EMBODIMENTS

Figure 1:
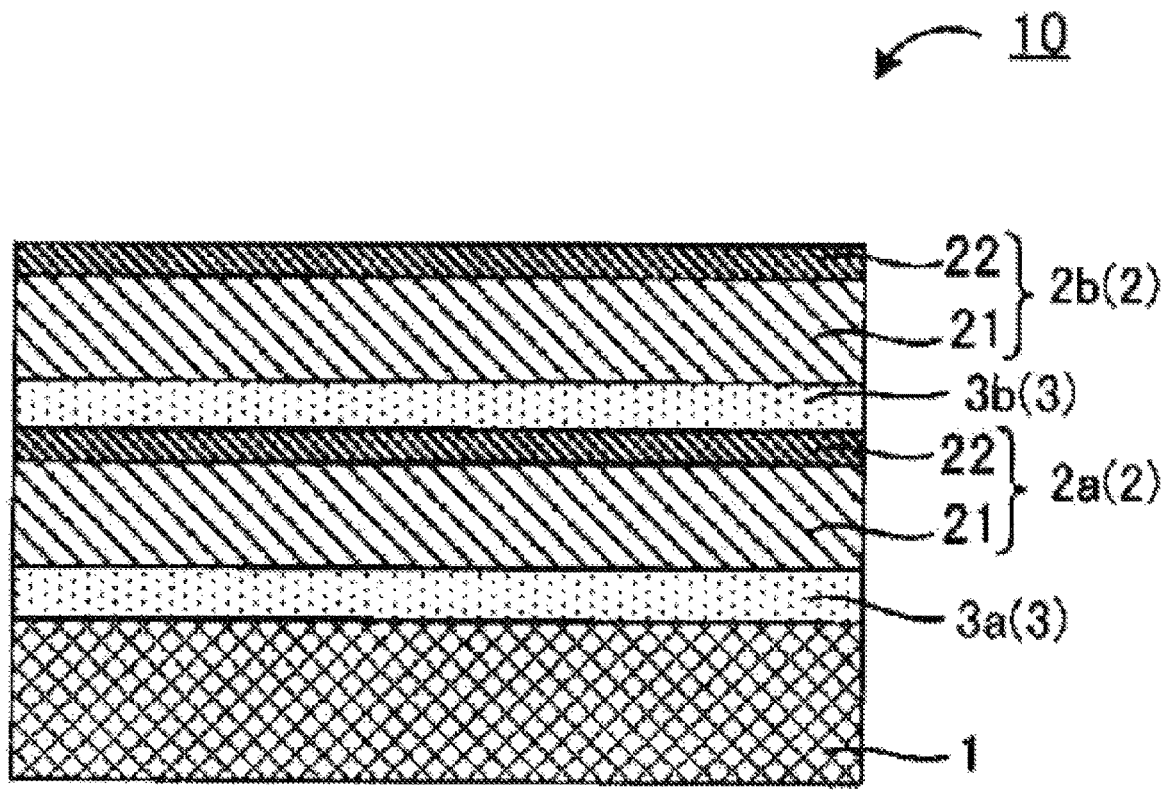
FIG. 1 is a schematic cross-sectional view showing an exemplary power storage device packaging material of the present disclosure.

Embodiments of a power storage device packaging material of the present disclosure will be described. In the following description, the "power storage device packaging material" is sometimes simply referred to as the "packaging material".

As described above, power storage devices have recently been used in various types of equipment, and have diversified in shape.

For example, recently, as a new type of electronic equipment, the development of a wearable terminal operated by the user wearing it has been rapidly in progress. Such a wearable terminal is required to have high conformability to movements of the users body. Correspondingly, a power storage device having flexibility has been required.

For example, a power storage device packaging material having a metal foil layer, as disclosed in Patent Literature 1, typically has low flexibility, although it has moldability.

One reason why the power storage device packaging material having a metal foil layer has low flexibility is that, for example, the metal foil layer has a relatively large thickness of about 40 μm. This is because the metal foil layer in the packaging material is configured to impart gas barrier properties, and is required to have a relatively large thickness in order to impart good gas barrier properties. Additionally, in the packaging material, the metal foil layer is required to have such a large thickness because, for example, the generation of pinholes in the metal foil layer needs to be prevented during press molding.

The inventors of the present disclosure have found that desired gas barrier properties and flexibility can be achieved by using a gas barrier film layer instead of the metal foil layer.

They have found, on the other hand, that a packaging material obtained using the gas barrier film layer has low electrolytic solution resistance. The inventors of the present disclosure have conducted further research on this issue, and consequently found that the electrolytic solution resistance of adhesive layers disposed between the films constituting the packaging material has a significant effect on the electrolytic solution resistance of the packaging material. The invention of the present disclosure has been made based on this finding.

In summary, the power storage device packaging material of the present disclosure is a power storage device packaging material in which a plurality of films are laminated, the packaging material comprising a heat-sealable resin layer, a gas barrier film layer laminated and disposed on one surface of the heat-sealable resin layer, and a plurality of adhesive layers, wherein the gas barrier film layer includes a resin base material and a gas barrier film disposed on one surface or both surfaces of the resin base material, and of the plurality of adhesive layers, at least an adhesive layer disposed between the heat-sealable resin layer and the gas barrier film layer has electrolytic solution resistance.

As used herein, the term "gas barrier properties" or "gas barrier performance" means the function of inhibiting the transmission of gases such as oxygen and/or water vapor, unless otherwise specified.

As used herein, any numerical range indicated by " . . . to . . . " means " . . . or more" and " . . . or less". For example, the recitation "2 to 15 mm" means 2 mm or more and 15 mm or less.

(Flexibility)

As used herein, the phrase "packaging material having flexibility" means that, when the packaging material is bent, the films and the adhesive layers constituting the packaging material are prevented from breakage to such an extent that the gas barrier properties can be maintained. Specifically, the phrase "packaging material having flexibility" means that the packaging material satisfies, for example, at least one of the characteristics 1 and 2 shown below. It is particularly preferred that the packaging material of the present disclosure satisfy both the characteristics 1 and 2.

Characteristic 1: a specimen (packaging material) after three-time bending has a water vapor transmission rate of 0.5 g/(m²·24 h) or less, and has an oxygen transmission rate of 0.5 cc/(m²·24 h·atm) or less.

Characteristic 2: the packaging material satisfies the relation: tensile elastic modulus (MPa)×(thickness (mm))³<2.5 (MPa·mm³).

In a flexible power storage device, it is important for the packaging material to have such flexibility. For example, a flexible power storage device used in a wearable terminal having high conformability to movements of the users body is required to employ a packaging material having resistance to the bending properties.

With respect to the characteristic 1, the three-time bending is performed under the following conditions: A rectangular sample that is 210 mm in width×297 mm in length (A4 size) is cut out from the packaging material. The sample is mounted on a Gelbo flex tester (for example, model name: BE1006 available from Tester Sangyo Co., Ltd.) such that one of the ends of the sample in the width direction is fixed to the disc-shaped stationary head, while the other end is fixed to the disc-shaped drive head having the same diameter and disposed at a distance from and parallel to the stationary head. In this manner, the sample is mounted in a cylindrical form on the outer perimeters of the stationary head and the drive head. In accordance with ASTM F392, the following reciprocating motion, which is performed at a rate of 40 cycles/minute, is repeated three times at a temperature of 25° C.: the distance between the stationary head and the drive head is reduced from 7 inches to 3.5 inches while the sample is being twisted at an angle of 440 degrees, the distance is then reduced to 1 inch while the sample continues to be twisted, and thereafter, the distance between the heads is increased to 3.5 inches, and then increased to 7 inches while the sample is being untwisted. The method for measuring the water vapor transmission rate and the method for measuring the oxygen transmission rate are the same as the methods described in the "2. Characteristics of Packaging Material" section below. In order to achieve particularly high flexibility, it is particularly preferred that the packaging material after the three-time bending have a water vapor transmission rate of 0.3 g/(m²·24 h) or less, and have an oxygen transmission rate of 0.3 cc/(m²·24 h·atm) or less. The lower limit of the water vapor transmission rate is, for example, 0.0 g/(m²·24 h) or 0.1 g/(m²·24 h), and the lower limit of the oxygen transmission rate is, for example, 0.0 cc/(m²·24 h·atm) or 0.1 cc/(m²·24 h·atm).

With respect to the characteristic 2, the tensile elastic modulus of the packaging material is measured as follows: The tensile elastic modulus is measured in accordance with JIS K7161-1:2014 (Plastics—Determination of tensile properties—Part 1: General principles), using the following method for measuring the tensile elastic modulus: A rectangular sample having a width of 15 mm is cut out from the packaging material, and then the tensile elastic modulus is measured using a tensile testing machine, at a distance between the chucks of 100 mm and a tensile speed of 100 mm/min, using a pre-load. The measurement is performed in an environment having a temperature of 23° C. and a relative humidity of 55%. The length of the sample is determined in a range of lengths where the grips can be mounted such that the sample length corresponds to the shaft of the testing machine, and the grips do not shift during the measurement. The length of the sample is, for example, about 120 mm. The tensile testing machine is preferably Instron 5565 (available from Instron Japan Co., Ltd.). The pre-load is, for example, in the range: $(E_t/10{,}000) \leq \sigma_0 \leq (E_t/3{,}000)$, where $\sigma_0$ denotes stress, and Et denotes elastic modulus (when an elastic modulus and a stress appropriate for the pre-load are unknown, predicted values of the elastic modulus and stress are evaluated in advance in a preliminary test). Because the value of tensile elastic modulus may vary depending on the in-plane direction of the packaging material, the in-plane average value is preferably employed. The in-plane average value can be defined as the average of values under eight conditions sampled by varying the condition of the in-plane direction of the packaging material by approximately 22.5 degrees. If the samples under eight conditions cannot be obtained by varying the condition of the in-plane direction by 22.5 degrees for the reason that, for example, the packaging material is small, the tensile elastic modulus of the packaging material is determined by obtaining as many as possible of samples by, for example, employing approximately equal conditions of the in-plane direction of the packaging material (that is, angles at which the 180-degree angle is divided approximately equally).

In order to achieve high flexibility, the packaging material preferably satisfies the relation: 0.5≤tensile elastic modulus (MPa)×(thickness (mm))³<2.5 (MPa·mm³), more preferably satisfies the relation: 0.5≤tensile elastic modulus (MPa)×(thickness (mm))³≤2.0 (MPa·mm³), still more preferably satisfies the relation: 0.5≤tensile elastic modulus (MPa)×(thickness (mm))³≤1.5 (MPa·mm³), and particularly preferably satisfies the relation: 0.5≤tensile elastic modulus (MPa)×(thickness (mm))³≤1.0 (MPa·mm³).

In order to achieve high flexibility, the tensile elastic modulus of the packaging material is preferably 1.0 GPa or more and 3.0 GPa or less, more preferably 1.1 GPa or more and 2.9 GPa or less, and still more preferably 1.3 GPa or more and 2.8 GPa or less, but is not limited thereto. The method for measuring the tensile elastic modulus is as described above.

The packaging material of the present disclosure is now described with the drawings. FIG. 1 is a schematic cross-sectional view showing an exemplary packaging material of the present disclosure. A power storage device packaging material 10 has flexibility. The power storage device packaging material 10 is a material in which a plurality of films are laminated. The power storage device packaging material 10 includes a heat-sealable resin layer 1, a gas barrier film layer 2 laminated and disposed on one surface of the heat-sealable resin layer 1, and a plurality of adhesive layers 3. The plurality of adhesive layers 3 are disposed between the plurality of films. FIG. 1 shows an example in which two gas barrier film layers 2a and 2b are laminated and disposed on one surface of the heat-sealable resin layer 1.

The adhesive layers 3 are typically disposed between the heat-sealable resin layer 1, the gas barrier film layer 2a, and the gas barrier film layer 2b. In the present disclosure, of the adhesive layers 3a and 3b, at least the adhesive layer 3a, disposed between the heat-sealable resin layer 1 and the gas barrier film layer 2a, has electrolytic solution resistance.

When the power storage device packaging material 10 is used for a power storage device, typically, the heat-sealable resin layer 1 is disposed on the power storage device element side.

According to the present disclosure, because the power storage device packaging material includes the gas barrier film layers and the adhesive layer having electrolytic solution resistance, it can exhibit good flexibility as well as electrolytic solution resistance.

Moreover, because the packaging material of the present disclosure has good flexibility, it can be used as, for example, a packaging material for a power storage device that is conformable to movements of a wearable terminal.

Furthermore, because the packaging material of the present disclosure has good flexibility, it can have improved processability. This makes the packaging material of the present disclosure applicable to packaging materials for power storage devices with various shapes, small power storage devices, and thin-film power storage devices, for example.

The packaging material of the present disclosure will be hereinafter described in detail.

1. Structure of Packaging Material

The packaging material of the present disclosure has a structure in which a plurality of films are laminated. The packaging material includes a heat-sealable resin layer, a gas barrier film layer, and adhesive layers.

The thickness of the packaging material is not limited; however, in view of flexibility, the upper limit is preferably 150 µm or less, 140 µm or less, 130 µm or less, 100 µm or less, or 90 µm or less, while the lower limit is preferably 50 µm or more, 55 µm or more, or 60 µm or more. Preferred ranges of the thickness of the packaging material include 50 µm or more and 150 µm or less; 55 µm or more and 150 µm or less; 60 µm or more and 150 µm or less; 50 µm or more and 140 µm or less; 55 µm or more and 140 µm or less; 60 µm or more and 140 µm or less; 50 µm or more and 130 µm or less; 55 µm or more and 130 µm or less; 60 µm or more and 130 µm or less; 50 µm or more and 100 µm or less; 55 µm or more and 100 µm or less; 60 µm or more and 100 µm or less; 50 µm or more and 90 µm or less; 55 µm or more and 90 µm or less; and 60 µm or more and 90 µm or less.

(1) Adhesive Layer

The adhesive layers of the present disclosure are layers disposed between the plurality of films. That is, the adhesive layers are disposed between all of the films constituting the packaging material.

In the present disclosure, of the plurality of adhesive layers, at least an adhesive layer disposed between the heat-sealable resin layer and the gas barrier film layer has electrolytic solution resistance.

In the present disclosure, it is preferred that all of the plurality of adhesive layers have electrolytic solution resistance. Specifically, in the power storage device packaging material 10 shown in FIG. 1 or 2, it is preferred that both the adhesive layers 3a and 3b have electrolytic solution resistance, and in the power storage device packaging material 10 shown in FIG. 3, it is preferred that all of the adhesive layers 3a, 3b, and 3c have electrolytic solution resistance.

The phrase "adhesive layer has electrolytic solution resistance" typically means that the adhesive layer is resistant to deterioration due to an electrolytic solution. Deterioration of the adhesive layer is typically defined in terms of peeling strength.

The electrolytic solution resistance of the adhesive layer means that, for example, the ratio (peeling strength retention ratio) of the peeling strength (N/15 mm) of the adhesive layer after the below-described electrolytic solution resistance test, relative to the peeling strength (N/15 mm) of the adhesive layer before the electrolytic solution resistance test, is 50% or more. The peeling strength retention ratio is preferably 70% or more, more preferably 80% or more, and still more preferably 90% or more.

The conditions for the electrolytic solution resistance test are as follows:

First, the packaging material is cut into a size of 60 mm (machine direction; MD)×150 mm (transverse direction; TD). Subsequently, the cut piece of the power storage device packaging material is folded in half in the transverse direction such that the heat-sealable resin layer opposes itself, and one pair of opposing sides in the transverse direction and one pair of opposing sides in the machine direction are heat-sealed for 3 seconds at a surface pressure of 1 MPa and a temperature of 190° C. As a result, a bag-shaped packaging material having an opening on one side in the transverse direction is prepared. Subsequently, 3 g of an electrolytic solution (1 mole/liter lithium hexafluorophosphate solution; the solvent is ethylene carbonate:diethyl carbonate:dimethyl carbonate=1:1:1 (volume ratio)) is injected through the opening, and the opening is heat-sealed across a width of 7 mm for 3 seconds at a surface pressure of 1 MPa and a temperature of 190° C. Subsequently, with the heat-sealed region of the opening of the packaging material facing upward, the packaging material is allowed to stand in a thermostatic chamber at 85° C. for 24 hours.

The conditions for measuring the peeling strength of the adhesive layer are as follows:

The electrolytic solution is discharged by cutting the upper side (the heat-sealed region of the opening of the packaging material) of the packaging material subjected to the above-described<electrolytic solution resistance test>and the two sides on both sides of the upper side. Subsequently, the electrolytic solution is wiped off well, and the packaging material is cut into a specimen having a rectangular shape with a width of 15 mm such that the TD direction corresponds to the longitudinal direction of the specimen. Three such specimens are obtained from regions that are not heat-sealed. Subsequently, the heat-sealable resin layer and the gas barrier film layer are partially peeled part in the longitudinal direction, starting from a longitudinal end of the specimen. This peeling is manually done. Subsequently, with the heat-sealable resin layer facing upward, the heat-sealable resin layer, the gas barrier film layer, and the like (entire laminate formed on the heat-sealable resin layer) are each fixed (chucked) onto a tensile testing machine (for example, product name: TENSILON Universal Material Testing Instrument RTG-12180 available from A&D Company, Limited), and a peel test is performed at a tensile speed of 50 mm/min, a peel angle of 180°, and a peel distance of 25 mm. The average value of peeling strengths (N/15 mm) at peel distances of 10 to 20 mm is determined as the peeling strength of the adhesive layer. The peeling strength represents the average value measured for the three specimens.

The adhesive layer may have the above-described electrolytic solution resistance to an electrolytic solution of a power storage device for which the packaging material of the present disclosure is used. For example, the adhesive layer preferably has the electrolytic solution resistance to an electrolytic solution containing a solvent mixture having a volume ratio of ethylene carbonate, diethyl carbonate:dimethyl carbonate=1:1:1, and lithium hexafluorophosphate as an electrolyte.

The adhesive layer to be used in the present disclosure is not limited as long as it has the above-described electrolytic solution resistance, and the adhesive layer may be appropriately selected according to the type of the electrolytic solution of the power storage device for which the packaging material is used.

The inventors of the present disclosure have conducted extensive research to find that an adhesive layer containing an acid-modified polyolefin having a melting temperature (melting point) of 50° C. or more and 120° C. or less as a base resin, and containing an epoxy resin having a weight average molecular weight of 50 or more and 2,000 or less as a curing agent, exhibits good electrolytic solution resistance.

That is, in the present disclosure, the adhesive layer having electrolytic solution resistance preferably contains a cured product of an acid-modified polyolefin having a melting temperature of 50° C. or more and 120° C. or less and an epoxy resin having a weight average molecular weight of 50 or more and 2,000 or less.

It is generally difficult to directly specify the structure and the properties of the cured product contained in the adhesive layer, because they vary depending on, for example, the type of the acid-modified polyolefin, the type of the epoxy resin, the presence or absence of an additive, curing conditions, and the like. Thus, the cured product contained in the adhesive layer will be hereinafter described referring to the components of the adhesive before curing.

The acid-modified polyolefin is preferably a polyolefin modified with an unsaturated carboxylic acid or an acid anhydride thereof. The acid-modified polyolefin may further be modified with a (meth)acrylic acid ester. The acid-modified polyolefin further modified with a (meth)acrylic acid ester is obtained by acid modification of a polyolefin, using an unsaturated carboxylic acid or an acid anhydride thereof in combination with a (meth)acrylic acid ester. As used herein, "(meth)acrylic acid ester" means "acrylic acid ester" or "methacrylic acid ester". A single acid-modified polyolefin may be used, or two or more acid-modified polyolefins may be used in combination.

The polyolefin to be acid-modified is not limited as long as it is a resin containing at least an olefin as a monomer unit.

The polyolefin may be composed of, for example, at least one of polyethylene and polypropylene. The polyolefin is preferably composed of polypropylene. Polyethylene may be composed of, for example, at least one of homopolyethylene and an ethylene copolymer. Polypropylene may be composed of, for example, at least one of homopolypropylene and a propylene copolymer. Examples of the propylene copolymer include copolymers of propylene with other olefins, such as ethylene-propylene copolymer, propylene-butene copolymer, and ethylene-propylene-butene copolymer. In order to further improve the insulation properties and the durability of the packaging material, the proportion of propylene units in polypropylene is preferably 50 mol % or more and 100 mol % or less, and more preferably 80 mol % or more and 100 mol % or less. Furthermore, in order to further improve the insulation properties and the durability of the packaging material, the proportion of ethylene units in polyethylene is preferably 50 mol % or more and 100 mol % or less, and more preferably 80 mol % or more and 100 mol % or less. The ethylene copolymer and the propylene copolymer may each be either a random copolymer or a block copolymer. Moreover, the ethylene copolymer and the propylene copolymer may each be either crystalline or amorphous, and may each be a copolymer or a mixture thereof. The polyolefin may be formed of a single homopolymer or copolymer, or may be formed of two or more homopolymers or copolymers.

Examples of the unsaturated carboxylic acid include acrylic acid, methacrylic acid, maleic acid, itaconic acid, fumaric acid, and crotonic acid. The acid anhydride is preferably an acid anhydride of the unsaturated carboxylic acid exemplified above, and is more preferably maleic anhydride or itaconic anhydride. The acid-modified polyolefin may be one modified with a single unsaturated carboxylic acid or an acid anhydride thereof, or may be one modified with two or more unsaturated carboxylic acids or acid anhydrides thereof.

The (meth)acrylic acid ester is, for example, an ester formed from (meth)acrylic acid and a $C_{1\text{-}30}$ alcohol, and is preferably an ester formed from (meth)acrylic acid and a $C_{1\text{-}20}$ alcohol. Specific examples of the (meth)acrylic acid ester include methyl (meth)acrylate, ethyl (meth)acrylate, propyl (meth)acrylate, butyl (meth)acrylate, hexyl (meth)acrylate, octyl (meth)acrylate, decyl (meth)acrylate, lauryl (meth)acrylate, octyl (meth)acrylate, dodecyl (meth)acrylate, and stearyl (meth)acrylate. In the modification of the polyolefin, a single (meth)acrylic acid ester may be used, or two or more (meth)acrylic acid esters may be used.

The content of the unsaturated carboxylic acid or acid anhydride thereof in the acid-modified polyolefin is preferably 0.1% by mass or more and 30% by mass or less, and more preferably 0.1% by mass or more and 20% by mass or less. When the content falls in this range, the insulation properties and the durability of the packaging material can be further improved.

The content of the (meth)acrylic acid ester in the acid-modified polyolefin is preferably 0.1% by mass or more and 40% by mass or less, and more preferably 0.1% by mass or more and 30% by mass or less. When the content falls in this range, the insulation properties and the durability of the packaging material can be further improved.

The acid-modified polyolefin preferably has a weight average molecular weight of 6,000 or more and 200,000 or less, and more preferably has a weight average molecular weight of 8,000 or more and 150,000 or less. As used herein, the weight average molecular weight of the acid-modified polyolefin is the value measured by gel permeation chromatography (GPC), using polystyrene as standard samples. Specific measurement conditions are as follows:

For gel permeation chromatography (GPC) measurement, "Waters Alliance 2695" is used, three columns are used, and THF (tetrahydrofuran) is used as the eluent. The experiment is conducted under experimental conditions employing a sample concentration of 0.5%, a flow rate of 1.0 ml/min, a sample injection volume of 50 μl, a measurement temperature of 40° C., and an RI detector. A calibration curve is created using the "polystyrene standard sample TSK standard" available from Tosoh Corporation.

The acid-modified polyolefin preferably has a melting temperature of 50° C. or more and 120° ° C. or less, and more preferably has a melting temperature of 50° C. or more and 100° C. or less. As used herein, the melting temperature of the acid-modified polyolefin refers to the melting peak temperature as measured by differential scanning calorimetry. In the present disclosure, the melting temperature of the cured product constituting the adhesive layer preferably falls in the above-defined numerical range. The melting temperature of the cured product of the present disclosure may be measured in accordance with JIS K7121:2012, using, for example, EXSTAR6000 available from Seiko Instruments Inc.

The method of modifying the polyolefin to obtain the acid-modified polyolefin is not limited; for example, the polyolefin may be copolymerized with an unsaturated carboxylic acid or an acid anhydride thereof, and a (meth) acrylic acid ester. Examples of copolymerization methods include random copolymerization, block copolymerization, and graft copolymerization (graft modification). Graft copolymerization is preferred.

The epoxy resin is not limited as long as it is a resin capable of forming a crosslinked structure through an epoxy group present in the molecule, and a known epoxy resin may be used. In the present disclosure, the epoxy resin may have a weight average molecular weight in the range from 50 or more and 2,000 or less. In order to further improve the insulation properties and the durability of the packaging material, the epoxy resin preferably has a weight average molecular weight of 100 or more and 1,000 or less, and more preferably has a weight average molecular weight of 200 or more and 800 or less. As used herein, the weight average molecular weight of the epoxy resin is the value measured by gel permeation chromatography (GPC), using polystyrene as standard samples. Since the specific measurement conditions are the same as the conditions described above for the acid-modified polyolefin, the description is omitted here.

The adhesive layer having electrolytic solution resistance may be a cured product of a resin composition containing at least one selected from the group consisting of a compound having an isocyanate group, a compound having an oxazoline group, and a compound having an epoxy group.

While the compound having an isocyanate group is not limited, it is preferably a polyfunctional isocyanate compound, in order to effectively improve the adhesion to the gas barrier film layer. The polyfunctional isocyanate compound is not limited as long as it is a compound having two or more isocyanate groups. Specific examples of polyfunctional isocyanate-based curing agents include pentane diisocyanate (PDI), isophorone diisocyanate (IPDI), hexamethylene diisocyanate (HDI), tolylene diisocyanate (TDI), diphenylmethane diisocyanate (MDI), polymer or isocyanurate forms thereof, mixtures thereof, and copolymers thereof with other polymers. Examples also include adducts, biurets, isocyanurates, and other forms thereof.

The content of the compound having an isocyanate group in the adhesive layer is preferably in the range from 0.1 to 50% by mass, and more preferably in the range from 0.5 to 40% by mass, in the resin composition constituting the adhesive layer. This can effectively improve the adhesion to the gas barrier film layer and the like.

The compound having an oxazoline group is not limited as long as it is a compound having an oxazoline backbone. Specific examples of the compound having an oxazoline group include those having a polystyrene main chain and those having an acrylic main chain. Commercial products include, for example, the Epocros series available from Nippon Shokubai Co., Ltd.

The content of the compound having an oxazoline group in the adhesive layer is preferably in the range from 0.1 to 50% by mass, and more preferably in the range from 0.5 to 40% by mass, in the resin composition constituting the adhesive layer. This can effectively improve the adhesion to the gas barrier film layer and the like.

Examples of the compound having an epoxy group include an epoxy resin. The epoxy resin is not limited as long as it is a resin capable of forming a crosslinked structure through an epoxy group present in the molecule, and the above-described epoxy resin may be used.

Specific examples of the epoxy resin include glycidyl ether derivative of trimethylolpropane, bisphenol A diglycidyl ether, modified bisphenol A diglycidyl ether, novolac glycidyl ether, glycerol polyglycidyl ether, and polyglycerol polyglycidyl ether. A single epoxy resin may be used, or two or more epoxy resins may be used in combination.

The content of the epoxy resin in the adhesive layer is preferably in the range from 0.1 to 50% by mass, and more preferably in the range from 0.5 to 40% by mass, in the resin composition constituting the adhesive layer. This can effectively improve the adhesion to the gas barrier film layer and the like.

The adhesive layer having electrolytic solution resistance may also be a cured product of a resin composition containing a curing agent having at least one selected from the group consisting of an oxygen atom, a heterocyclic ring, a C=N bond, and a C—O—C bond. The adhesive layer having electrolytic solution resistance may also contain at least one selected from the group consisting of an ester resin and an epoxy resin.

Examples of the curing agent having a heterocyclic ring include a curing agent having an oxazoline group, a curing agent having an epoxy group, and a curing agent having an isocyanate group. Examples of the curing agent having a C=N bond include a curing agent having an oxazoline group. Examples of the curing agent having a C—O—C bond include a curing agent having an oxazoline group and a curing agent having an epoxy group. The fact that the adhesive layer is a cured product of a resin composition containing these curing agents can be confirmed using a method such as gas chromatography-mass spectrometry (GCMS), infrared spectroscopy (IR), time-of-flight secondary ion mass spectrometry (TOF-SIMS), or X-ray photoelectron spectroscopy (XPS).

When the adhesive layer is a cured product of a resin composition containing at least one selected from the group consisting of a compound having an isocyanate group, a compound having an oxazoline group, and an epoxy resin, and containing the above-described acid-modified polyolefin, the acid-modified polyolefin functions as a base resin, and each of the compound having an isocyanate group, the compound having an oxazoline group, and the compound having an epoxy group functions as a curing agent.

The adhesive layer preferably contains at least one selected from the group consisting of a polyester and an epoxy resin, and more preferably contains an epoxy resin. The polyester is preferably an amide ester resin, for example. The amide ester resin is typically produced by reacting a carboxyl group and an oxazoline group. The adhesive layer is more preferably a cured product of a resin composition containing at least one of these resins and the above-described acid-modified polyolefin. When unreacted matter of the curing agent such as the compound having an isocyanate group, the compound having an oxazoline group, or the epoxy resin remains in the adhesive layer, the presence of the unreacted matter can be confirmed using a method selected from, for example, infrared spectroscopy, Raman spectroscopy, and time-of-flight secondary ion mass spectrometry (TOF-SIMS).

(2) Gas Barrier Film Layer

The gas barrier film layer of the present disclosure has a resin base material and a gas barrier film disposed on one surface or both surfaces of the resin base material. The gas barrier film layer is disposed on one surface of the heat-sealable resin layer, and mainly contributes to the gas barrier properties of the packaging material.

(i) Gas Barrier Film

The gas barrier film is a film that is disposed on one surface or both surfaces of the resin base material, and has gas barrier properties. The gas barrier film mainly contributes to the gas barrier properties of the gas barrier film layer.

The gas barrier film may be formed of an inorganic material or an organic material, and is preferably formed of an inorganic material because of its high gas barrier properties.

Examples of the organic material include an ethylene-vinyl alcohol copolymer (EVOH), a propylene-vinyl alcohol copolymer (PVOH), and polyvinylidene chloride (PVDC).

Examples of the inorganic material include a metal (including an alloy) and an inorganic compound. Examples of the gas barrier film containing an inorganic material include a metal film (such as a vapor-deposited metal film), a film containing an inorganic compound as a main component (hereinafter sometimes referred to as an inorganic compound film), and a film containing a mixed compound of an organic portion and an inorganic portion as a main component (sometimes referred to as an organic-inorganic composite film).

Examples of the metal constituting the metal film include metals such as aluminum, stainless steel, titanium, nickel, iron, and copper, and alloys containing these metals. In view of flexibility, the metal film is particularly preferably formed of aluminum.

Examples of the inorganic compound constituting the inorganic compound film include compounds containing metallic elements or nonmetallic elements, such as silicon, aluminum, magnesium, calcium, potassium, tin, sodium, titanium, boron, yttrium, zirconium, cerium, and zinc. Examples of these inorganic compounds include inorganic oxides, inorganic oxynitrides, inorganic nitrides, inorganic oxycarbides, inorganic oxycarbonitrides, and silicon-zinc oxide. Specific examples include silicon oxides such as $SiO_2$, aluminum oxides such as $Al_2O_3$, magnesium oxide, titanium oxide, tin oxide, silicon-zinc alloy oxide, indium alloy oxide, silicon nitride, aluminum nitride, titanium nitride, and silicon oxynitride. A single inorganic compound may be used, or a mixture of the above-described materials at any ratio may be used.

Examples of the mixed compound of an organic portion and an inorganic portion constituting the organic-inorganic composite film include a mixed compound of a resin portion and an inorganic portion. The resin constituting the organic portion may be, for example, the resin exemplified below as the material constituting the resin base material. The inorganic material constituting the inorganic portion may be, for example, the inorganic compound exemplified as the material of the inorganic compound film. Alternatively, any of the below-described materials of an overcoat layer that exhibits gas barrier properties by itself may be used. Specifically, KURARISTER CF available from Kuraray Co., Ltd., for example, may be used.

The above-described gas barrier film may be a coating film formed by coating or the like, or may be a vapor-deposited film. In particular, the gas barrier film is preferably a vapor-deposited film, because it has high adhesion to the resin base material, and can exhibit high gas barrier performance. This gas barrier film may be a single-layer film formed by performing vapor deposition once, or may be a multi-layer film formed by performing vapor deposition a plurality of times.

When the gas barrier film is a multi-layer film, films having the same composition may be combined, or films having different compositions may be combined. When the gas barrier film is a multi-layer film, the entire multi-layer film corresponds to a single gas barrier film.

The thickness of the gas barrier film is not limited as long as it can exhibit desired gas barrier properties, and may be determined appropriately according to the type of the gas barrier film. The thickness of the gas barrier film may be in the range of, for example, 5 nm or more and 200 nm or less, and is preferably in the range of 10 nm or more and 100 nm or less. When the gas barrier film is a multi-layer film, the thickness refers to the thickness of a single gas barrier film.

If the thickness of the gas barrier film is less than the above-defined range, the film may not be sufficiently formed, and may not exhibit desired gas barrier properties. Moreover, the film may not be able to maintain the strength, and deteriorate with time. On the other hand, if the thickness of the gas barrier film is greater than the above-defined range, the gas barrier film may easily develop a defect when subject to a mechanical stress, such as bending, or may have decreased flexibility.

The gas barrier film may be formed using a method that allows the film to be formed at a desired thickness on one surface or both surfaces of the resin base material, and a conventional method such as a coating method, a vapor deposition method, or a pressure-bonding method may be employed according to the type of the gas barrier film.

(ii) Resin Base Material

The resin base material is not limited as long as it can support the gas barrier film; for example, a resin film or a resin sheet is suitably used. When the resin base material is a resin film, the resin film may be unoriented, or may be uniaxially or biaxially oriented. As used herein, "film" is used synonymously with "sheet".

Examples of the resin to be used as the resin base material include, but are not limited to, various resins such as polyolefin resins, such as polyethylene and polypropylene; polyester resins, such as polyethylene terephthalate (PET), polyethylene naphthalate (PEN), and polybutylene terephthalate (PBT); cyclic polyolefin resins; polystyrene resins; acrylonitrile-styrene copolymers (AS resins); acrylonitrile-butadiene-styrene copolymers (ABS resins); poly(meth) acrylic resins; polycarbonate resins; polyvinyl alcohol-based resins, such as polyvinyl alcohol (PVA) resins and ethylene-vinyl alcohol copolymer (EVOH) resins; polyamide resins, such as various nylons; polyimide resins; polyurethane resins; acetal resins; and cellulose resins.

When the packaging material includes a plurality of gas barrier film layers, a hydrophilic group-containing resin is preferably used as the resin base material of a gas barrier film layer disposed closer to the heat-sealable resin layer. This is because a hydrophilic group-containing resin exhibits good barrier properties against oxygen even at high temperature, and can thereby improve the oxygen barrier performance of the packaging material. As used herein, "hydrophilic group" refers to an atomic group that is weakly bound to water molecules by electrostatic interactions or hydrogen bonding, and shows affinity for water. For example, an atomic group containing a polar group or a dissociable group, such as a hydroxy group (—OH), a carboxy group (—COOH), an amino group (—NH$_2$), a carbonyl group (>CO), or a sulfo group (—SO$_3$H), exhibits this property. Examples of the hydrophilic group-containing resin include PVA resins, (meth)acrylic resins, cellulose resins, and natural polymers such as polysaccharides.

The resin base material may contain various plastic compounding agents, additives, and the like. Examples of the additives include lubricants, crosslinking agents, antioxidants, UV absorbents, light stabilizers, fillers, reinforcing agents, antistatic agents, pigments, and modifier resins. The resin base material may also be subjected to a surface treatment. This can improve the adhesion to the gas barrier film.

While the thickness of the resin base material is not limited, it may be in the range of, for example, 6 μm or more and 200 μm or less, and is preferably in the range of 9 μm or more and 100 μm or less.

(iii) Overcoat Layer

The gas barrier film layer may include an overcoat layer on a surface of the gas barrier film opposite to the resin base material. The presence of the overcoat layer can further improve the gas barrier properties of the gas barrier film layer.

The material constituting the overcoat layer is not limited, and may be a material generally used as an overcoating agent. For example, a mixed compound containing an organic portion and an inorganic portion may be used as a main component of the overcoat layer.

While the mixed compound includes various compounds, the mixed compound may be, for example, an alumina phosphate-based mixed compound, such as KURARISTER CF (registered trademark) available from Kuraray Co., Ltd.; a zinc acrylate-based mixed compound, such as BESELA (registered trademark) available from Toppan Printing Co., Ltd.; a gas barrier resin composition containing a resin and an inorganic layered compound; or a sol-gel compound obtained by polycondensation of a raw material solution containing a water-soluble polymer and one or more alkoxides represented by the general formula $R^1{}_nM(OR^2)_m$ (where $R^1$ and $R^2$ each represent a $C_{1-8}$ organic group, M represents a metal atom, n represents an integer of 0 or more, m represents an integer of 1 or more, and n+m represents the valence of M), by the sol-gel process. Examples of the water-soluble polymer include polyvinyl alcohol-based resins, ethylene-vinyl alcohol copolymers, acrylic acid-based resins, natural polymer-based methyl cellulose, carboxymethyl cellulose, cellulose nanofibers, and polysaccharides. In the present disclosure, the sol-gel compound is preferably used as the overcoat layer. This is because the sol-gel compound has high interfacial adhesive strength. Moreover, with the sol-gel compound, the film formation treatment can be performed at a relatively low temperature, such that the resin base material and the like can be prevented from thermal degradation.

While the thickness of the overcoat layer is not limited, it may be in the range of, for example, 50 nm or more and 500 nm or less.

(iv) Others

Figure 2:
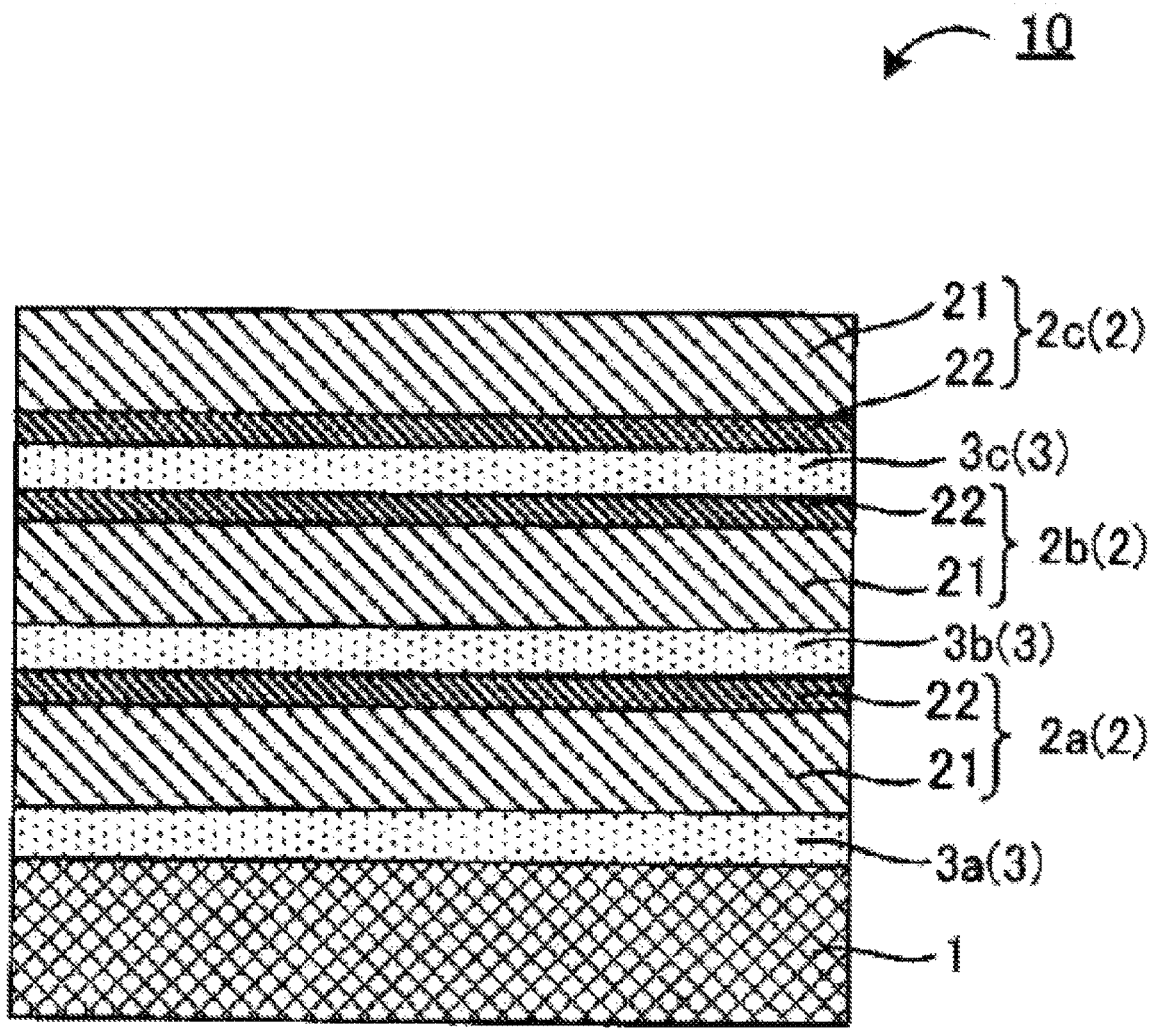
FIG. 2 is a schematic cross-sectional view showing an exemplary power storage device packaging material of the present disclosure.

The packaging material of present disclosure includes at least two gas barrier film layers. While the number of gas barrier film layers is not limited, it is preferably in the range of 2 or more and 4 or less, more preferably in the range of 2 or more and 3 or less, and is particularly preferably 3. That is, as shown in FIG. 2, the packaging material of the present disclosure preferably includes the three gas barrier film layers 2a, 2b, and 2c. The gas barrier film layers may have the same or different structures.

In the packaging material of the present disclosure, the gas barrier film layers are laminated and disposed on one surface of the heat-sealable resin layer. In the packaging material, the order in which the resin base material and the gas barrier film are disposed in each gas barrier film layer is not limited, and may be appropriately determined according to the layer structures of the layers other than the gas barrier film layers used together in the packaging material, the number of the gas barrier film layers, and the like. Moreover, when the packaging material is used for a power storage device, the order in which the resin base material and the gas barrier film are disposed in the gas barrier film layer disposed on the outermost side is not limited. For example, as shown in FIG. 1, the gas barrier film layer 2b may be disposed such that the resin base material 21 faces the heat-sealable resin layer 1. Alternatively, as shown in FIG. 2, the gas barrier film layer 2c may be disposed such that the gas barrier film 22 faces the heat-sealable resin layer 1.

In the present disclosure, for example, when the gas barrier film 22 is disposed only on one surface of the resin base material 21, it is preferred that, as shown in FIG. 1, the resin base material 21 of the gas barrier film layer 2a adjacent to the heat-sealable resin layer 1 be disposed to face the heat-sealable resin layer 1. Furthermore, as shown in FIGS. 1 and 2, it is preferred that the resin base materials 21 of both two gas barrier film layers 2a and 2b adjacent to the heat-sealable resin layer 1 be disposed to face the heat-sealable resin layer 1. Because the resin base materials 21 are disposed to face the heat-sealable resin layer 1, the gas barrier films 22 are disposed closer to the center of the packaging material in the thickness direction. Moreover, the gas barrier films 22 are disposed opposite to the heat-sealable resin layer 1, which is easily thermally deformed. Therefore, even if the packaging material is bent or exposed to heat, the stress applied to the gas barrier films 2 can be reduced. This can prevent generation of cracks in the gas barrier films 22.

(3) Heat-Sealable Resin Layer

The heat-sealable resin layer of the present disclosure is capable of being heat-sealed, and is a region that is contacted with power storage device elements when a power storage device is formed using the packaging material. The heat-sealable resin layer is also a region that forms heat-seal surfaces where opposing ends of the packaging material are heat-sealed.

The material of the heat-sealable resin layer is preferably a thermoplastic resin, because it is capable of being melted and fused by heating. Examples of the thermoplastic resin include polyethylenes such as linear short-chain branched polyethylene (LLDPE), polyolefins such as cast polypropylene (CPP), polyesters such as polyethylene terephthalate (PET), polyethylene naphthalate (PEN), and polybutylene terephthalate (PBT), polyvinyl acetate, polyvinyl chloride, (meth)acryl, polyurethane, polyamide-based resins such as nylons, polyvinyl alcohols such as polyvinyl alcohol (PVA) and ethylene-vinyl alcohol copolymers (EVOH).

In the present disclosure, the material of the heat-sealable resin layer is preferably cast polypropylene (CPP) among the above-mentioned materials. This is because cast polypropylene (CPP), which has high heat resistance, can provide a packaging material having good durability against heat generated by the power storage device elements. Polypropylene used as the raw material of a polypropylene film is classified into a homopolymer produced using a single monomer and a copolymer produced using two or more monomers. The copolymer can be further classified according to the monomer sequence, for example, into a random copolymer having an unordered monomer sequence and a block copolymer having a long continuous sequence of the same species of monomer. In the present disclosure, cast polypropylene of a homopolymer is preferred. This is because a cast polypropylene film of a homopolymer has a high indentation modulus, and imparts good pinhole resistance to the packaging material.

An acid-modified polyolefin may also be used as the material of the heat-sealable resin layer. The acid-modified polyolefin is a polymer obtained by modifying the above-described polyolefin by block polymerization or graft polymerization with a carboxylic acid or the like. Examples of the carboxylic acid to be used for the modification include maleic acid, acrylic acid, itaconic acid, crotonic acid, maleic anhydride, and itaconic anhydride.

The heat-sealable resin layer preferably has a melting temperature (melting point) in the range of, for example, 80° C. or more and 300° C. or less, and more preferably has a melting temperature (melting point) in the range of 100° C. or more and 250° C. or less. If the melting temperature of the heat-sealable resin layer is excessively low, the sealed surface of the packaging material may be possibly peeled, under the use environment of the power storage device formed using the packaging material of the present disclosure. On the other hand, if the melting temperature of the heat-sealable resin layer is excessively high, the packaging material needs to be heat-sealed at a high temperature, and thus, the gas barrier film layer and the like used together as the packaging material may be possibly thermally degraded.

The thickness of the heat-sealable resin layer is not limited, and is preferably in the range of, for example, 15 μm or more and 100 μm or less. If the thickness of the heat-sealable resin layer is greater than the above-defined range, a reduction in the gas barrier properties of the packaging material, for example, may occur, whereas if the thickness is less than the above-defined range, desired adhesion may not be obtained. The thickness of the heat-sealable resin layer is more preferably in the range of 25 μm or more and 90 μm or less, and is still more preferably in the range of 30 μm or more and 80 μm or less.

The heat-sealable resin layer of the present disclosure preferably has an indentation modulus that falls in a predetermined range. Specifically, with respect to the indentation modulus of the heat-sealable resin layer, the lower limit is preferably 0.5 GPa or more, and more preferably 1.0 GPa or more, while the upper limit is preferably 5.0 GPa or less, more preferably 4.5 GPa or less, and still more preferably 3.5 GPa or less. Preferred ranges include about 0.5 GPa or more and 5.0 GPa or less; about 0.5 GPa or more and 5.0 GPa or less; about 0.5 GPa or more and 3.5 GPa or less; about 1.0 GPa or more and 5.0 GPa or less; about 1.0 GPa or more and 5.0 GPa or less; and about 1.0 GPa or more and 3.5 GPa or less. This is because, if the indentation modulus of the heat-sealable resin layer is excessively low, stress concentration may easily occur on the gas barrier film layer upon bending of the packaging material, and the gas barrier film layer may be possibly easily fractured. On the other hand, if the indentation modulus of the heat-sealable resin layer is excessively high, the heat-sealable resin layer may be possibly easily fractured due to stress concentration upon bending of the packaging material. Moreover, the flexibility of the packaging material may be possibly reduced.

In the present disclosure, when the indentation modulus of the heat-sealable resin layer falls in the above-defined range, the packaging material has good pinhole resistance.

In particular, when the heat-sealable resin layer is a polypropylene film (such as a cast polypropylene film), the indentation modulus is preferably 0.8 GPa or more, more preferably 0.8 GPa or more and 5.0 GPa or less, and still more preferably 1.0 GPa or more and 4.0 GPa or less. When the heat-sealable resin layer is a polyethylene film, the indentation modulus is preferably 1.0 GPa or less, more preferably 0.2 GPa or more and 1.0 GPa or less, and still more preferably 0.3 GPa or more and 0.8 GPa or less. The preferred indentation modulus varies depending on the type of the resin constituting the heat-sealable resin layer. This is because, when, for example, a polypropylene film such as a cast polypropylene film is used, setting the indentation modulus of the heat-sealable resin layer to the above-defined value increases the rigidity of the entire packaging material, and improves bending resistance. On the other hand, when a polyethylene film is used, setting the indentation modulus of the heat-sealable resin layer to the above-defined value increases the flexibility of the entire packaging material, and improves bending resistance.

The indentation modulus of the heat-sealable resin layer is measured in accordance with ISO 14577:2015, using the following method for measuring the indentation modulus: For a cross section of a sample, the indentation modulus is measured using an ultra-low loaded hardness tester equipped with a Vickers indenter (square pyramidal diamond indenter having an angle between opposite faces of 136°), in an environment at about 23° C. and about 60% RH. The measurement is performed at an indentation speed of 0.1 μm/sec, an indentation depth of 2 μm, a holding time of 5 seconds, and a drawing speed of 0.1 μm/sec. The ultra-low loaded hardness tester is preferably PICODENTOR HM500 (available from Fischer Instruments K.K.). For one set of conditions, at least five samples are measured, and the average of the measured values is determined as the value of indentation modulus for the conditions. The cross section of the sample refers to an exposed cross section of the sample obtained by fixing the sample by hardening the outer periphery of the sample with a curable resin-based adhesive, and cutting the fixed sample with a diamond knife in the thickness direction.

The thickness of each film in calculating the indentation modulus index may be measured by measuring the cut cross section through observation with an optical microscope.

(4) Protective Film

The packaging material of present disclosure may include a protective film besides the heat-sealable resin layer, the gas barrier film layer, and the like described above. When the packaging material includes the protective film, the films used together as the packaging material, such as the heat-sealable resin layer and the gas barrier film layer, can be protected against damage and degradation. The protective film can be distinguished from the above-described films in that a layer having gas barrier properties is not disposed on any surface of the protective film. While the position where the protective film is disposed in the packaging material is not limited, the protective film is preferably disposed on a surface of the gas barrier film layer opposite to the heat-sealable resin layer, and is more preferably disposed on the position as the outermost layer (uppermost layer) when a power storage device is formed.

As the protective film, a resin having a melting point higher than that of the heat-sealable resin layer is preferably used. The resin may be either in the form of a sheet or a film. Examples of this protective film include thermosetting resins such as nylons, polyesters, polyamides, polypropylene, polyurethanes, amino resins, silicone resins, epoxy resins, and polyimides (PI), polyvinyl chloride (PVC), polycarbonates (PC), polystyrene (PS), polyvinyl alcohols (PVA), ethylene-vinyl acetate copolymers (EVA), polyacrylonitrile (PAN), and cellulose nanofibers (CNF) in the form of sheets, films, and the like. In particular, oriented nylon (ONY), polyethylene terephthalate (PET), polyethylene naphthalate (PEN), polybutylene terephthalate (PBT), oriented polypropylene (OPP), polyvinyl chloride (PVC), and the like are suitably used.

The protective film may be single-layered, or may be multi-layered in which layers composed of the same material or different materials are laminated. The protective film may also be subjected to a surface treatment, such as corona discharge treatment, in order to improve the adhesion to other layers. The thickness of the protective film is typically in the range of about 5 μm or more and 80 μm or less, but is not limited thereto.

The protective film may include other materials such as anti-blocking agents, lubricants, flame retardants, and fillers. These materials may be composed of inorganic compounds. Alternatively, a hard coat layer containing an inorganic compound, for example, may be formed.

2. Characteristics of Packaging Material

The packaging material of the present disclosure has gas barrier properties sufficient to prevent degradation of power storage device elements due to air. The packaging material of the present disclosure preferably has an oxygen transmission rate of 0.5 cc/($m^2$·24 h·atm) or less, still preferably has an oxygen transmission rate of 0.1 cc/($m^2$·24 h·atm) or less, and particularly preferably has an oxygen transmission rate of 0.05 cc/($m^2$·24 h·atm) or less. The packaging material of the present disclosure preferably has a water vapor transmission rate of 0.5 g/($m^2$·24 h) or less, preferably has a water vapor transmission rate of 0.1 g/($m^2$·24 h) or less, and particularly preferably has a water vapor transmission rate of 0.05 g/($m^2$·24 h) or less. When the packaging material has gas barrier properties that fall in the above-defined range, the power storage device elements can be sealed satisfactorily.

The oxygen transmission rate may be measured using an oxygen gas transmission rate-measuring apparatus at a temperature of 23° C. and a humidity of 60% RH, in accordance with JIS K7126-2:2006 (Plastics—Film and sheeting—Determination of gas-transmission rate—Part 2: Equal-pressure method; Appendix A: Method of testing oxygen gas transmission rate using electrolysis sensor method). The oxygen gas transmission rate-measuring apparatus may be, for example, OXTRAN available from MOCON Inc., USA. At the time of the measurement, the packaging material is mounted in the apparatus such that the surface positioned on the gas barrier film layer side in the thickness direction of the packaging material, relative to the heat-sealable resin layer, is contacted with oxygen gas. A transmission area of 50 $cm^2$ is used. The measurement is performed by the following procedure: First, a carrier gas is supplied for 60 minutes or more at a flow rate of 10 cc/min to purge the apparatus. The carrier gas may be nitrogen gas containing about 5% of hydrogen. After purging, a test gas is flown into the apparatus, and a time of 12 hours from the start of flow is allowed to pass until an equilibrium state is reached; thereafter, the measurement is started at the temperature and humidity described above. The test gas is dry oxygen containing at least 99.5% (by volume) of oxygen. For one set of conditions, at least three samples are measured, and the average of the measured values is determined as the value of oxygen transmission rate for the conditions. The oxygen transmission rate described herein may be measured using the same method as described above.

The water vapor transmission rate is measured in accordance with JIS K7129-B:2008 (Plastics—Film and sheeting—Determination of water vapour transmission rate (measurement method using equipment); Appendix B: Infrared detection sensor method), using the following method: Using a water vapor transmission rate-measuring apparatus, the measurement is performed at a temperature of 40° C. and a humidity of 90% RH (condition 3). The packaging material is mounted in the apparatus such that its outer side (side on which the gas barrier film layer on the heat-sealable resin layer is disposed) is on the high-humidity side (water vapor supply side). A transmission area of 50 $cm^2$ is used. The water vapor transmission rate-measuring apparatus is preferably PERMATRAN (PERMATRAN-W (registered trademark) Model 3/33 available from Mocon Inc., USA). NIST film #3 is used as a reference specimen. For one set of conditions, at least three samples are measured, and the average of the measured values is determined as the value of water vapor transmission rate for the conditions. The water vapor transmission rate described herein may be measured using the same method as described above.

In the present disclosure, in order for the packaging material to exhibit a high mechanical strength at a thickness of 100 μm or less, the packaging material preferably has a piercing strength of 20 N or more as measured from a side opposite to the heat-sealable resin layer, in accordance with the method specified in JIS Z1707:1995. With respect to the piercing strength, the lower limit is 22 N or more, for example, while the upper limit is preferably 40 N or less, and more preferably 30 N or less. Preferred ranges include 20N or more and 40 N or less; 20 N or more and 30 N or less; 22 N or more and 40 N or less; and 22 N or more and 30 N or less. With respect to the piercing strength (N/μm I) per unit thickness of the entire packaging material, the lower limit is preferably 0.20 N/μm or more, and is more preferably 0.22 N/μm or more, while the upper limit is preferably 0.40 N/μm or less, and is more preferably 0.30 N/μm or less. Preferred ranges include 0.20 N or more and 0.40 N or less; 0.20 N or more and 0.30 N or less; 0.22 N or more and 0.40 N or less; and 0.22 N or more and 0.30 N or less. The piercing strength may be adjusted by selecting the type (such as composition or molecular weight), the thickness, the lamination structure, the degree of stretching, and the like of each of the layers (particularly layers containing a resin, such as the resin base material and the heat-sealable resin layer) constituting the packaging material. In particular, by using a biaxially oriented nylon film, an oriented ethylene-vinyl alcohol copolymer (EVOH) film, and the like, the piercing strength can be increased without increasing the thickness of the packaging material.

In the present disclosure, the packaging material may have an ash content in the range of 1.0% by mass or more and 20.0% by mass or less, or in the range of 1.0% by mass or more and 16.0% by mass or less, or in the range of 1.0% by mass or more and 15.0% by mass or less, or even in the range of 1.0% by mass or more and 5.0% by mass or less. The ash content in the packaging material is similar to the inorganic compound component content in the entire packaging material. In general, inorganic compounds are more brittle than organic compounds, and are more likely to develop defects than organic compounds upon application of an equal stress. The higher the inorganic compound component content in the entire packaging material, the higher the tendency for minute defects to occur. In the present disclosure, when the ash content in the packaging material falls in the above-defined range, particularly the development of minute defects upon bending can be prevented.

It may also be possible to evaluate the likelihood of development of minute defects due to an inorganic compound upon bending by, for example, identifying the thickness of each of the films or layers containing the inorganic compound. Examples of inorganic compound components contained in the packaging material include an inorganic compound component in the gas barrier film of the gas barrier film layer. As the gas barrier film, however, a gas barrier film formed of a foil or formed by vapor deposition, coating, or any of various other methods is used as appropriate. Moreover, in the case of a gas barrier film formed by vapor deposition or coating, the density of the formed film, for example, may vary depending on the formation conditions, and an organic compound component may also be contained in the film. It is therefore difficult to evaluate the likelihood of development of minute defects upon bending, solely based on the thickness of the gas barrier film. It is also difficult to determine the inorganic compound component content solely based on the thickness of the gas barrier film. Furthermore, inorganic compound components may be incorporated for various purposes into the resin base material, the heat-sealable resin layer, the adhesive layers, and the like. In this case, the effect of these inorganic compound components also needs to be considered. As with the gas barrier film, however, the methods of forming these films or layers and the conditions therefor, the raw materials, and the like may vary. Therefore, it is difficult to evaluate the likelihood of development of minute defects upon bending, solely based on the thicknesses of these films or layers. The ash content is highly advantageous as a comprehensive index for the development of minute defects upon bending when inorganic compounds are used in a complicated manner, such as, for example, in cases where inorganic compounds are used in structures other than the gas barrier film layer, such as the resin base material, the heat-sealable resin layer, the protective film, and the adhesive layers.

The ash content is determined by finding the proportion of noncombustible inorganic compounds that remain after the packaging material is burnt out, in the mass of the entire packaging material. In the present disclosure, a mass of a measurement sample is measured using a thermogravimetry/differential thermal analyzer (TG-DTA); thereafter, the measurement sample is ashed by heating, in an aluminum pan under an air atmosphere, from room temperature to 600° C. at a heating rate of 10° C./min, followed by continued heating at 600° C. for 30 minutes, and a value in percentage of a mass after heating relative to the mass before heating is determined as the ash content. The thermogravimetry/differential thermal analyzer may be TG8120 available from Rigaku Corporation.

3. Others

Examples of the method for producing the packaging material of the present disclosure include a dry lamination process in which films that have been previously formed are bonded with an adhesive; and a bonding process in which the materials of the gas barrier film layer that have been heat-melted are bonded by extrusion with a T-die or the like, and the resulting laminate is bonded to the heat-sealable resin layer with an adhesive.

The present disclosure is not limited to the foregoing embodiments. The foregoing embodiments are merely illustrative, and any embodiments that include features that are substantially identical to the technical concept disclosed in the claims of the present disclosure, and attain similar effects, are included in the technical scope of the present disclosure.

EXAMPLES

The present disclosure will be more specifically described hereinafter with examples and comparative examples.

The abbreviations of the films used to prepare packaging materials are as shown below. Table 1 shows the details of the films.

Al vapor-deposited PET12: a polyethylene terephthalate (PET) film (thickness: 12 μm) having an aluminum (Al) film (thickness: 55 nm) vapor-deposited on one surface Al vapor-deposited OPP15: an oriented polypropylene (OPP) film (thickness: 15 μm) having an aluminum (Al) film (thickness: 55 nm) vapor-deposited on one surface Al vapor-deposited EVOH15: an ethylene-vinyl alcohol copolymer (EVOH) film (thickness: 15 μm) having an aluminum (Al) film (thickness: 55 nm) vapor-deposited on one surface $SiO_2$ vapor-deposited ON15: a nylon film (thickness: 15 μm) having a silicon dioxide ($SiO_2$) film (thickness: 10 nm) vapor-deposited on one surface Barrier PET12: a polyethylene terephthalate (PET) film (thickness: 12 μm) having a barrier coat layer composed of a mixed composition of aluminum oxide-phosphoric acid (hereinafter referred to as the $Al_2O_3$+ P-based coat layer) on one surface CPP30: cast polypropylene film (thickness: 30 μm)
CPP40: cast polypropylene film (thickness: 40 μm)
CPP80: cast polypropylene film (thickness: 80 μm)
LLDPE30: linear short-chain branched polyethylene film (thickness: 30 μm)
LLDPE50: linear short-chain branched polyethylene film (thickness: 50 μm)
PET12: biaxially oriented polyethylene terephthalate film (thickness: 12 μm)
ON15: biaxially oriented nylon film (thickness: 15 μm)
A16: aluminum foil (thickness: 6 μm)
A140: aluminum foil (thickness: 40 μm)

TABLE 1

| Abbreviations of Films | Company Name | Product Name |
|---|---|---|
| Al vapor-deposited PET12 | Toray Advanced Film Co., Ltd. | BR1517 |
| Al vapor-deposited OPP15 | Toray Advanced Film Co., Ltd. | VM-OPP |
| Al vapor-deposited EVOH15 | Kuraray Co., Ltd. | TMXL |
| $SiO_2$ vapor-deposited ON15 | Dai Nippon Printing Co., Ltd. | IB-ON-UB |

TABLE 1-continued

| Abbreviations of Films | Company Name | Product Name |
| --- | --- | --- |
| Barrier PET12 | Kuraray Co., Ltd. | KURARISTER CF (registered tradename) |
| CPP30 | Mitsui Chemicals Tohcello. Inc. | SC |
| CPP40 | Toray Advanced Film Co., Ltd. | 3301 |
| CPP80 | Mitsui Chemicals Tohcello. Inc. | RXC-22 |
| LLDPE30 | Mitsui Chemicals Tohcello. Inc. | TUX HCE |
| LLDPE50 | Mitsui Chemicals Tohcello. Inc. | TUX HCE |
| PET12 | Unitika Ltd. | PTMB |
| ON15 | Unitika Ltd. | ONM |
| A16 | Foil available from UACJ Corporation | 8021 |
| A140 | Foil available from UACJ Corporation | 8021 |

Example 1

(Preparation of Adhesive)

As a base resin, acid-modified polypropylene (weight average molecular weight: 72,900) having a solids content of 20% by mass and a melting temperature (melting point) of 50° C. was prepared. As a curing agent, an epoxy resin having a solids content of 10% by mass and a weight average molecular weight of 500 was prepared. The weight average molecular weight was measured by gel permeation chromatography (GPC) using "Waters Alliance 2695", three "Shodex GPC LF-804 (available from Showa Denko K.K.; 8.0 mm, I.D.×300 mm)" columns, and THF (tetrahydrofuran) as the eluent. The experiment was conducted under experimental conditions employing a sample concentration of 0.5%, a flow rate of 1.0 ml/min, a sample injection volume of 50 μl, a measurement temperature of 40° C., and an RI detector. A calibration curve was created using the "polystyrene standard sample TSK standard" available from Tosoh Corporation.

10 parts by weight of the acid-modified polypropylene and 0.5 part by weight of the epoxy resin were mixed to obtain an adhesive.

(Production of Packaging Material)

CPP30 as a heat-sealable resin layer, Al vapor-deposited PET12 as a first gas barrier film layer, Al vapor-deposited PET12 as a second gas barrier film layer, and $SiO_2$ vapor-deposited ON15 as a third gas barrier film layer were laminated in this order to obtain a packaging material. The first gas barrier film layer and the second gas barrier film layer were disposed such that the PET film of the first gas barrier film layer faced the Al vapor-deposited film of the second gas barrier film layer, and the third gas barrier film layer was disposed such that the $SiO_2$ vapor-deposited film faced the heat-sealable resin layer.

Adhesive layers formed of the above-described adhesive were disposed between these film layers, and the films were bonded with the adhesive layers therebetween.

Specifically, the method of bonding the films was as follows: The adhesive was applied to one of two adjacently disposed films in the packaging material to give an applied amount of 1.5 g/m² to form an adhesive layer. Subsequently, the film on which the adhesive layer was disposed and the other film were bonded by pressing with the adhesive interposed therebetween.

The packaging material was obtained by the above-described procedure.

Example 2

LLDPE50 as a heat-sealable resin layer, Al vapor-deposited PET12 as a first gas barrier film layer, Al vapor-deposited PET12 as a second gas barrier film layer, and barrier PET12 as a third gas barrier film layer were laminated in this order to obtain a packaging material. The resin base material and the gas barrier film of each of the gas barrier film layers faced the same sides as in Example 1. Each of the gas barrier film layers was disposed such that the barrier coat layer faced the heat-sealable resin layer.

Adhesive layers were disposed by applying the two-liquid curable adhesive described in Example 1 to give an applied amount of 1.5 g/m², and the films were bonded. The packaging material was obtained by the above-described procedure.

Example 3

LLDPE50 as a heat-sealable resin layer, Al vapor-deposited OPP12 as a first gas barrier film layer, Al vapor-deposited PET12 as a second gas barrier film layer, and barrier PET12 as a third gas barrier film layer were laminated in this order to obtain a packaging material. The resin base material and the gas barrier film of each of the gas barrier film layers faced the same sides as in Example 1. Each of the gas barrier film layers was disposed such that the barrier coat layer faced the heat-sealable resin layer.

Adhesive layers were disposed by applying the two-liquid curable adhesive described in Example 1 to give an applied amount of 1.5 g/m, and the films were bonded. The packaging material was obtained by the above-described procedure.

Example 4

LLDPE50 as a heat-sealable resin layer, Al vapor-deposited PBT12 as a first gas barrier film layer, barrier PET12 as a second gas barrier film layer, and barrier PET12 as a third gas barrier film layer were laminated in this order to obtain a packaging material. The resin base material and the gas barrier film of each of the gas barrier film layers faced the same sides as in Example 1. Each of the gas barrier film layers was disposed such that the barrier coat layer faced the heat-sealable resin layer.

Adhesive layers were disposed by applying the two-liquid curable adhesive described in Example 1 to give an applied amount of 1.5 g/m, and the films were bonded. The packaging material was obtained by the above-described procedure.

Example 5

(Preparation of Adhesive)

As a base resin, acid-modified polypropylene (weight average molecular weight: 155,800) having a solids content of 15% by mass and a melting temperature (melting point) of 80° C. was prepared. As a curing agent, hexamethylene diisocyanate (HDI) having a solids content of 100% by mass was prepared. The weight average molecular weight of the acid-modified polypropylene was measured by gel permeation chromatography (GPC) using "Waters Alliance 2695", three "Shodex GPC LF-804 (available from Showa Denko K.K.; 8.0 mm, I.D.×300 mm)" columns, and THF (tetrahydrofuran) as the eluent. The experiment was conducted under experimental conditions employing a sample concentration of 0.5%, a flow rate of 1.0 ml/min, a sample injection volume of 50 μl, a measurement temperature of 40° C., and an RI detector. A calibration curve was created using the "polystyrene standard sample TSK standard" available from Tosoh Corporation. 20 parts by weight of the acid-modified polypropylene and 0.1 part by weight of the isocyanate resin were mixed to obtain an adhesive.
(Production of Packaging Material)

A packaging material was obtained as in Example 1, except that the adhesive prepared in Example 5 was used.

Comparative Example 1

(Preparation of Adhesive)

A two-liquid curable adhesive was prepared by mixing a base resin containing a polyester polyol as a main component (product name: RU-77T, available from ROCK PAINT Co., Ltd.), a curing agent containing an aliphatic polyisocyanate (product name: H-7, available from ROCK PAINT Co., Ltd.), and ethyl acetate as the solvent at a weight ratio of base resin:curing agent:solvent=10:1:14.
(Production of Packaging Material)

CPP40 as a heat-sealable resin layer, Al vapor-deposited PET12 as a first gas barrier film layer, Al vapor-deposited PET12 as a second gas barrier film layer, and $SiO_2$ vapor-deposited ON15 as a third gas barrier film layer were laminated in this order to obtain a packaging material. The first gas barrier film layer and the second gas barrier film layer were disposed such that the Al vapor-deposited film of the first gas barrier film layer faced the Al vapor-deposited film of the second gas barrier film layer, and the third gas barrier film layer was disposed such that the gas barrier film faced the heat-sealable resin layer.

The films were bonded as in Example 1, except that adhesive layers were disposed by applying the two-liquid curable adhesive described above to give an applied amount of 3.5 g/m². The packaging material was obtained by the above-described procedure.

Comparative Example 2

CPP80 as a heat-sealable resin layer, A140 as a first gas barrier film layer, ON15 as a first protective film, and PET12 as a second protective film were laminated in this order to obtain a packaging material.

The films were bonded as in Example 1, except that adhesive layers were disposed by applying the two-liquid curable adhesive described in Comparative Example 1 to give an applied amount of 3.5 g/m². The packaging material was obtained by the above-described procedure.

Comparative Example 3

LLDPE30 as a heat-sealable resin layer, Al vapor-deposited PET12 as a first gas barrier film layer, barrier PET12 as a second gas barrier film layer, barrier PET12 as a third gas barrier film layer, and barrier PET12 as a fourth gas barrier film layer were laminated in this order to obtain a packaging material. The first gas barrier film layer and the second gas barrier film layer were disposed such that the Al vapor-deposited film of the first gas barrier film layer faced the barrier coat layer of the second gas barrier film layer, and each of the third gas barrier film layer and the fourth gas barrier film layer was disposed such that the barrier coat layer faced the heat-sealable resin layer.

The films were bonded as in Example 1, except that adhesive layers were disposed by applying the two-liquid curable adhesive described in Comparative Example 1 to give an applied amount of 3.5 g/m². The packaging material was obtained by the above-described procedure.

Comparative Example 4

CPP40 as a heat-sealable resin layer, Al vapor-deposited PET12 as a first gas barrier film layer, Al vapor-deposited PET12 as a second gas barrier film layer, and Al vapor-deposited PET12 as a third gas barrier film layer were laminated in this order to obtain a packaging material. The resin base material and the gas barrier film of each of the gas barrier film layers faced the same sides as in Comparative Example 1.

The films were bonded as in Example 1, except that adhesive layers were disposed by applying the two-liquid curable adhesive described in Comparative Example 1 to give an applied amount of 3.5 g/m². The packaging material was obtained by the above-described procedure.

Comparative Example 5

LLDPE50 as a heat-sealable resin layer, A16 as a first gas barrier film layer, and ON15 as a first protective film were laminated in this order to obtain a packaging material.

The films were bonded as in Example 1, except that adhesive layers were disposed by applying the two-liquid curable adhesive described in Comparative Example 1 to give an applied amount of 3.5 g/m. The packaging material was obtained by the above-described procedure.

Table 2 shows the structures of the packaging materials of Examples 1 to 4 and Comparative Examples 1 to 5. The "Packaging Material Structure" column in Table 2 shows the order in which the films are laminated, although the adhesive layers disposed between the layers are omitted. Each "/" in Table 2 shows an interface between the films.

TABLE 2

| | Film Structure (each "/" shows an interface between the films) | Adhesive Base Resin | Caring Agent |
|---|---|---|---|
| Ex. 1 | CPP30/Al vapor-deposited PET12/ Al vapor-deposited PET12/$SiO_2$ vapor-deposited ON15 | Acid-modified polypropylene | Epoxy resin |
| Ex. 2 | LLDPE50/Al vapor-deposited PET12/ barrier PET12/ barrier PET12 | | |
| Ex. 3 | LLDPE50/Al vapor-deposited OPP15/ Al vapor-deposited PET12/barrier PET12 | | |
| Ex. 4 | LLDPE50/Al vapor-deposited PBT20/ Al vapor-deposited PET12/barrier PET12 | | |
| Ex. 5 | CPP30/Al vapor-deposited PET12/ Al vapor-deposited PET12/$SiO_2$ vapor-deposited OPP15 | Acid-modified polypropylene | HDI |
| Comp. Ex. 1 | CPP30/Al vapor-deposited PET12/ Al vapor-deposited PET12/$SiO_2$ vapor-deposited ON15 | Polyester polyol | Aliphatic poly-isocyanate |
| Comp. Ex. 2 | CPP80/A140/ON15/PET12 | | |
| Comp. Ex. 3 | LLDPE30/Al vapor-deposited PET12/ barrier PET12/barrier PET12/barrier PET12 | | |
| Comp. Ex. 4 | CPP40/Al vapor-deposited PET12/ Al vapor-deposited PET12/Al vapor-deposited PET12 | | |
| Comp. Ex. 5 | LLDPE50/A16/ON15 | | |

[Evaluations]
(Electrolytic Solution Resistance (Peeling Strength))

The electrolytic solution resistance test was carried out on each packaging material, and the peeling strengths between the heat-sealable resin layer and the barrier film layer before and after the test were measured.

Heat-sealing during the production of the bag-shaped packaging material was performed at a temperature of 190° C. and a surface pressure of 1.0 MPa for a heating and pressing time of 3 seconds. As the electrolytic solution, an electrolytic solution obtained by mixing lithium hexafluorophosphate into a solution mixture having a volume ratio of ethylene carbonate:diethyl carbonate:dimethyl carbonate=1:1:1 was used. The conditions for the electrolytic solution resistance test and the conditions for measuring the peeling strength were as described in "(1) Adhesive Layer" in the "1. Structure of Packaging Material" section above. The electrolytic solution resistance was evaluated under the criteria shown below, relative to the peeling strength (initial peeling strength) (100%) of each packaging material that had not been subjected to the electrolytic solution resistance test, which was determined by measuring the tensile strength in the same manner. The A and B ratings shown below represent excellent electrolytic solution resistance. The results are shown in Table 3.

A: The peeling strength was 80% or more of the initial peeling strength.
B: The peeling strength was 70% or more and less than 80% of the initial peeling strength.
C: The peeling strength was 50% or more and less than 70% of the initial peeling strength.
D: The peeling strength was less than 50% of the initial peeling strength.

TABLE 3

| | Peeling Strength (N/15 mm) | | |
|---|---|---|---|
| | before Test | after Test | Retention Ratio Relative to Initial Value |
| Ex. 1 | 4.1 | 2.9 | 71% |
| Ex. 2 | 9.0 | 8.7 | 97% |
| Ex. 3 | 5.5 | 5.2 | 95% |
| Ex. 4 | 5.7 | 5.5 | 96% |
| Ex. 5 | 6.5 | 6.4 | 98% |
| Comp. Ex. 1 | 7.2 | 1.7 | 24% |
| Comp. Ex. 2 | 10.8 | 10.1 | 94% |
| Comp. Ex. 3 | 6.0 | 1.9 | 32% |
| Comp. Ex. 4 | 6.5 | 1.1 | 17% |
| Comp. Ex. 5 | 10.6 | 2.8 | 26% |

When a laminate of a resin base material and a gas barrier film such as Al vapor-deposited PET12, Al vapor-deposited OPP15, Al vapor-deposited EVOH15, or $SiO_2$ vapor-deposited ON15 is used as a gas barrier film layer, vapor-deposited Al or the like constituting the gas barrier film may easily dissolve into the electrolytic solution. This creates a significant problem in that the electrolytic solution resistance of the packaging material needs to be improved. It is observed, however, that this problem was favorably solved by the packaging materials of Examples 1 to 4, in which the adhesive layers were formed using an adhesive having excellent electrolytic solution resistance.

(Piercing Strength)

For each packaging material, the piercing strength (N) was measured from a side opposite to the heat-sealable resin layer, using the method specified in JIS Z1707:1995. Additionally, from the measured piercing strength, the piercing strength (N/μm) per unit thickness was calculated. The piercing strength was measured using ZP-50N (force gauge) and MX2-500N (measurement stand) available from IMADA Co., Ltd. The results are shown in Table 4.

(Water Vapor Transmission Rate)

For each of the packaging materials of Examples 1 to 4 and Comparative Examples 1 to 5, the water vapor transmission rate at 40° C. and 90% RH was measured. The details of the measurement method are as described in the "2. Characteristics of Packaging Material" section. The results are shown in Table 4.

(Oxygen Transmission Rate)

For each of the packaging materials of Examples 1 to 4 and Comparative Examples 1 to 5, the oxygen transmission rate at 23° C. and 60% RH was measured. The details of the measurement method are as described in the "2. Characteristics of Packaging Material" section. The results are shown in Table 4.

(Evaluation of Flexibility)

The flexibility (water vapor transmission rate after three-time bending, oxygen transmission rate after three-time bending, and tensile elastic modulus×(thickness of packaging material)$^3$) of each of the packaging materials of Examples 1 to 4 and Comparative Examples 1 to 5 was evaluated. The details of the evaluation method are as described in the "packaging material having flexibility" section above. The results are shown in Table 4.

(Evaluation of Ash Content)

The ash content was evaluated for each of the packaging materials of Examples 1 to 4 and Comparative Examples 1 to 5. The details of the evaluation method are as described in the "2. Characteristics of Packaging Material" section. The results are shown in Table 4.

(Indentation Modulus of Heat-Sealable Resin Layer)

The indentation modulus of the heat-scalable resin layer of each of the packaging materials of Examples 1 to 4 and Comparative Examples 1 to 5 was measured. The details of the measurement method are as described in "(3) Heat-Sealable Resin Layer" in the "1. Structure of Packaging Material" section above. The results are shown in Table 4.

TABLE 4

| | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 |
|---|---|---|---|---|---|---|---|---|---|---|
| Thickness (μm) of Entire Packaging Material | 74 | 91 | 97 | 99 | 74 | 88 | 156 | 75 | 85 | 77 |
| Water Vapor Transmission Rate (g/(m² · day)) | <0.01 | <0.01 | <0.01 | <0.01 | <0.01 | <0.01 | <0.01 | <0.01 | 0.07 | <0.01 |
| Oxygen Transmission Rate (cc/(m² · day · atm)) | <0.01 | 0.03 | 0.03 | 0.03 | <0.01 | <0.01 | <0.01 | <0.01 | 0.11 | <0.01 |

TABLE 4-continued

|  | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 |
|---|---|---|---|---|---|---|---|---|---|---|
| Water Vapor Transmission Rate (g/(m$^2$ · day)) after Three-Time Bending | 0.15 | 0.46 | 0.25 | 0.41 | 0.14 | 0.15 | 0.15 | 0.53 | 0.51 | 0.02 |
| Oxygen Transmission Rate (cc/(m$^2$ · day · atm)) after Three-Time Bending | 0.18 | 0.43 | 0.41 | 0.21 | 0.17 | 0.18 | 0.80 | 0.16 | 0.86 | 0.02 |
| Piercing Strength (N/1 month) | 23 | 20 | 22 | 23 | 23 | 23 | 28 | 25 | 29 | 12 |
| Piercing Strength (N/μm) per Unit Thickness | 0.31 | 0.22 | 0.23 | 0.23 | 0.31 | 0.26 | 0.18 | 0.33 | 0.24 | 0.16 |
| Ash Content (%) in Packaging Material | 1.8 | 2.5 | 1.5 | 1.3 | 1.8 | 2.3 | 49.9 | 6.9 | 1.4 | 17.6 |
| Indentation Modulus (GPa) of Heat-Sealable Resin Layer | 1.1 | 0.6 | 0.6 | 0.6 | 1.1 | 1.1 | 0.4 | 0.6 | 1.1 | 0.6 |
| Tensile Elastic Modulus (GPa) | 1.7 | 1.7 | 1.9 | 2.2 | 1.7 | 1.6 | 2.1 | 2.3 | 1.6 | 1.9 |
| Tensile Elastic Modulus × (Thickness of Packaging Material)$^3$ (Mpa·mm$^3$) | 0.69 | 1.28 | 1.73 | 2.13 | 0.69 | 1.09 | 7.97 | 0.97 | 0.98 | 0.87 |

As is clear from the results shown in Table 4, with respect to each of the packaging materials of Examples 1 to 5, the specimen after three-time bending has a water vapor transmission rate of 0.5 g/(m$^2$·24 h) or less, and has an oxygen transmission rate of 0.5 cc/(m$^2$·24 h-atm) or less, and additionally, the piercing strength is 20 N or more, even though the thickness of the entire packaging material is as small as 100 μm or less. The packaging materials of Examples 1 to 5 exhibit high mechanical strength in addition to excellent flexibility. In contrast, with respect to each of the packaging materials of Comparative Examples 2 and 4, the specimen after three-time bending has an oxygen transmission rate above 0.5 cc/(m$^2$·24 h·atm). With respect to each of the packaging materials of Comparative Examples 3 and 4, the specimen after three-time bending has a water vapor transmission rate above 0.5 g/(m$^2$·24 h). These packaging materials do not exhibit favorable flexibility, compared with the packaging materials of Examples 1 to 5. With respect to the packaging material of Comparative Example 5, the piercing strength is below 20 N. Therefore, this packaging material does not exhibit high mechanical strength, compared with the packaging materials of Examples 1 to 5.

In summary, the present invention provides embodiments of the invention as itemized below:

Item 1. A power storage device packaging material in which a plurality of films are laminated, the packaging material comprising:
a heat-sealable resin layer, a gas barrier film layer laminated and disposed on one surface of the heat-sealable resin layer, and a plurality of adhesive layers, wherein
the gas barrier film layer includes a resin base material and a gas barrier film disposed on one surface or both surfaces of the resin base material, and
of the plurality of adhesive layers, at least an adhesive layer disposed between the heat-sealable resin layer and the gas barrier film layer has electrolytic solution resistance.

Item 2. The power storage device packaging material according to item 1, wherein the packaging material satisfies the relation: tensile elastic modulus (MPa)×(thickness (mm))$^3$<2.5 (MPa·mm$^3$).

Item 3. The power storage device packaging material according to item 1 or 2, wherein the packaging material has a thickness of 100 μm or less, and has a piercing strength of 20 N or more as measured from a side opposite to the heat-sealable resin layer, in accordance with a method specified in JIS Z1707:1995.

Item 4. The power storage device packaging material according to any one of items 1 to 3, wherein all of the plurality of adhesive layers have electrolytic solution resistance.

Item 5. The power storage device packaging material according to any one of items 1 to 4, wherein the adhesive layer having electrolytic solution resistance is a cured product of a resin composition containing at least one selected from the group consisting of a compound having an oxazoline group and a compound having an epoxy group.

Item 6. The power storage device packaging material according to any one of items 1 to 4, wherein the adhesive layer having electrolytic solution resistance is a cured product of a resin composition containing a curing agent having at least one selected from the group consisting of an oxygen atom, a heterocyclic ring, a C=N bond, and a C—O—C bond.

Item 7. The power storage device packaging material according to any one of items 1 to 4, wherein the adhesive layer having electrolytic solution resistance contains at least one selected from the group consisting of an ester resin and an epoxy resin.

Item 8. The power storage device packaging material according to any one of items 1 to 7, wherein the packaging material has a water vapor transmission rate of 0.1 g/(m$^2$·24 h) or less in an atmosphere having a temperature of 40° C. and a humidity of 90% RH.

Item 9. The power storage device packaging material according to any one of items 1 to 8, wherein the heat-sealable resin layer has an indentation modulus of 0.5 GPa or more.

Item 10. The power storage device packaging material according to any one of items 1 to 9, wherein an ash content as measured by the following method is 1.0% by mass or more and 20.0% by mass or less:
(Method of Measuring Ash Content)
a mass of a measurement sample is measured using a thermogravimetry/differential thermal analyzer; thereafter, the measurement sample is ashed by heating, in an aluminum pan under an air atmosphere, from room temperature to 600° C. at a heating rate of 10° C./min, followed by continued heating at 600° C. for 30 minutes, and a value in percentage of a mass after heating relative to the mass before heating is determined as the ash content.

Item 11. A power storage device comprising a power storage device element comprising at least a positive electrode, a negative electrode, and an electrolyte,
wherein the power storage device element is housed in a package formed of the power storage device packaging material according to any one of items 1 to 10.

Item 12. A method for producing a power storage device packaging material in which a plurality of films are laminated, the method comprising the step of:
laminating a heat-sealable resin layer, a gas barrier film layer, and a plurality of adhesive layers, wherein
the gas barrier film layer is laminated and disposed on one surface of the heat-sealable resin layer,
the gas barrier film layer includes a resin base material and a gas barrier film disposed on one surface or both surfaces of the resin base material, and
of the plurality of adhesive layers, at least an adhesive layer disposed between the heat-sealable resin layer and the gas barrier film layer has electrolytic solution resistance.

Item 13. The method for producing a power storage device packaging material according to item 12, wherein the packaging material satisfies the relation: tensile elastic modulus (MPa)×(thickness (mm))$^3$<2.5 (MPa·mm$^3$).

REFERENCE SIGNS LIST

1: Heat-sealable resin layer
2, 2a, 2b, and 2c: Gas barrier film layer
3, 3a, 3b, and 3c: Adhesive layer
4: Protective film
10: Power storage device packaging material
21: Resin base material
22: Gas barrier film

The invention claimed is:

1. A power storage device packaging material in which a plurality of films are laminated, the packaging material comprising:
a heat-sealable resin layer;
a gas barrier film layer laminated and disposed on one surface of the heat-sealable resin layer; and
a plurality of adhesive layers,
wherein:
the gas barrier film layer includes a resin base material and a gas barrier film disposed on one surface or both surfaces of the resin base material,
of the plurality of adhesive layers, at least an adhesive layer disposed between the heat-sealable resin layer and the gas barrier film layer has electrolytic solution resistance, and
the adhesive layer having electrolytic solution resistance contains (i) an acid-modified polyolefin having a melting temperature of 50° C. or more and 120° C. or less, and (ii) an epoxy resin having a weight average molecular weight of 50 or more and 2,000 or less and the adhesive layer having electrolytic solution resistance has a peeling strength retention ratio of 50% or more, the peeling strength retention ratio being a ratio of a peeling strength of the adhesive layer having electrolytic solution resistance after an electrolytic solution resistance test, relative to a peeling strength of the adhesive layer having electrolytic solution resistance before the electrolytic solution resistance test, the electrolytic solution resistance test being performed by:
folding the power storage device packaging material in half in the transverse direction such that the heat-sealable resin layer opposes itself;
heat sealing sides of the power storage device packaging material, thereby forming a bag-shaped packaging material having an opening;
injecting an electrolytic solution through the opening;
heat sealing the opening to close the bag-shaped packaging material;
allowing the closed bag-shaped packaging material to stand in a thermostatic chamber at 85° C. for 24 hours;
opening the closed bag-shaped packaging material and discharging the electrolytic solution;
peeling the heat-sealable resin layer and the gas barrier film layer apart at a tensile speed of 50 mm/min, a peel angle of 180°, and a peel distance of 25 mm; and
determining the peeling strength of the adhesive layer having electrolytic solution resistance as an average of values of peeling strength at peel distances of 10 to 20 mm.

2. The power storage device packaging material according to claim 1, wherein the packaging material satisfies the relation:
tensile elastic modulus (MPa)×(thickness (mm))$^3$<2.5 (MPa·mm$^3$).

3. The power storage device packaging material according to claim 1, wherein the packaging material has a thickness of 100 μm or less, and has a piercing strength of 20 N or more as measured from a side opposite to the heat-sealable resin layer, in accordance with a method specified in JIS Z1707:1995.

4. The power storage device packaging material according to claim 1, wherein all of the plurality of adhesive layers have electrolytic solution resistance.

5. The power storage device packaging material according to claim 1, wherein the packaging material has a water vapor transmission rate of 0.1 g/(m$^2$·24 h) or less in an atmosphere having a temperature of 40° C. and a humidity of 90% RH.

6. The power storage device packaging material according to claim 1, wherein the heat-sealable resin layer has an indentation modulus of 0.5 GPa or more.

7. The power storage device packaging material according to claim 1, having an ash content of 1.0% by mass or more and 20.0% by mass or less as measured by the following method:
measuring a mass of a measurement sample of the packaging material using a thermogravimetry/differential thermal analyzer;
thereafter, ashing the measurement sample by heating, in an aluminum pan under an air atmosphere, from room temperature to 600° C. at a heating rate of 10° C./min, followed by continued heating at 600° C. for 30 minutes; and
determining the ash content as a value in percentage of a mass after heating relative to the mass before heating.

8. A power storage device comprising a power storage device element comprising at least a positive electrode, a negative electrode, and an electrolyte, wherein
the power storage device element is housed in a package formed of the power storage device packaging material according to claim 1.

9. A method for producing the power storage device packaging material according to claim 1, the method comprising the step of:
laminating the heat-sealable resin layer, the gas barrier film layer, and the plurality of adhesive layers.

10. The method for producing a power storage device packaging material according to claim 9, wherein the packaging material satisfies the relation: tensile elastic modulus (MPa)×(thickness (mm))$^3$<2.5 (MPa·mm$^3$).

11. A power storage device packaging material in which a plurality of films are laminated, the packaging material comprising:
a heat-sealable resin layer;
a gas barrier film layer laminated and disposed on one surface of the heat-sealable resin layer; and
a plurality of adhesive layers,
wherein:
the gas barrier film layer includes a resin base material and a gas barrier film disposed on one surface or both surfaces of the resin base material,
of the plurality of adhesive layers, at least an adhesive layer disposed between the heat-sealable resin layer and the gas barrier film layer has electrolytic solution resistance, and
the adhesive layer having electrolytic solution resistance has a peeling strength retention ratio of 50% or more, the peeling strength retention ratio being a ratio of a peeling strength of the adhesive layer having electrolytic solution resistance after an electrolytic solution resistance test, relative to a peeling strength of the adhesive layer having electrolytic solution resistance before the electrolytic solution resistance test, the electrolytic solution resistance test being performed by:
folding the power storage device packaging material in half in the transverse direction such that the heat-sealable resin layer opposes itself;
heat sealing sides of the power storage device packaging material,
thereby forming a bag-shaped packaging material having an opening;
injecting an electrolytic solution through the opening;
heat sealing the opening to close the bag-shaped packaging material;
allowing the closed bag-shaped packaging material to stand in a thermostatic chamber at 85° ° C. for 24 hours;
opening the closed bag-shaped packaging material and discharging the electrolytic solution;
peeling the heat-sealable resin layer and the gas barrier film layer apart at a tensile speed of 50 mm/min, a peel angle of 180°, and a peel distance of 25 mm; and
determining the peeling strength of the adhesive layer having electrolytic solution resistance as an average of values of peeling strength at peel distances of 10 to 20 mm.

12. The power storage device packaging material according to claim 11, wherein the packaging material satisfies the relation:
tensile elastic modulus (MPa)×(thickness (mm))$^3$<2.5 (MPa·mm$^3$).

13. The power storage device packaging material according to claim 11, wherein the packaging material has a thickness of 100 μm or less, and has a piercing strength of 20 N or more as measured from a side opposite to the heat-sealable resin layer, in accordance with a method specified in JIS Z1707:1995.

14. The power storage device packaging material according to claim 11, wherein all of the plurality of adhesive layers have electrolytic solution resistance.

15. The power storage device packaging material according to claim 11, wherein the adhesive layer having electrolytic solution resistance is a cured product of a resin composition containing at least one selected from the group consisting of a compound having an oxazoline group and a compound having an epoxy group.

16. The power storage device packaging material according to claim 11, wherein the adhesive layer having electrolytic solution resistance is a cured product of a resin composition containing a curing agent having at least one selected from the group consisting of an oxygen atom, a heterocyclic ring, a C=N bond, and a C—O—C bond.

17. The power storage device packaging material according to claim 11, wherein the adhesive layer having electrolytic solution resistance contains at least one selected from the group consisting of an ester resin and an epoxy resin.

18. The power storage device packaging material according to claim 11, wherein the packaging material has a water vapor transmission rate of 0.1 g/(m$^2$·24 h) or less in an atmosphere having a temperature of 40° C. and a humidity of 90% RH.

19. The power storage device packaging material according to claim 11, wherein the heat-sealable resin layer has an indentation modulus of 0.5 GPa or more.

20. The power storage device packaging material according to claim 11, having an ash content of 1.0% by mass or more and 20.0% by mass or less as measured by the following method:
measuring a mass of a measurement sample of the packaging material using a thermogravimetry/differential thermal analyzer;
thereafter, ashing the measurement sample by heating, in an aluminum pan under an air atmosphere, from room temperature to 600° C. at a heating rate of 10° C./min, followed by continued heating at 600° C. for 30 minutes; and
determining the ash content as a value in percentage of a mass after heating relative to the mass before heating.

21. A power storage device comprising a power storage device element comprising at least a positive electrode, a negative electrode, and an electrolyte, wherein
the power storage device element is housed in a package formed of the power storage device packaging material according to claim 11.

22. A method for producing the power storage device packaging material according to claim 11, the method comprising:
laminating the heat-sealable resin layer, the gas barrier film layer, and the plurality of adhesive layers.

23. The method for producing a power storage device packaging material according to claim 22, wherein the packaging material satisfies the relation:
tensile elastic modulus (MPa)×(thickness (mm))$^3$<2.5 (MPa·mm$^3$).

* * * * *